Figure 1:
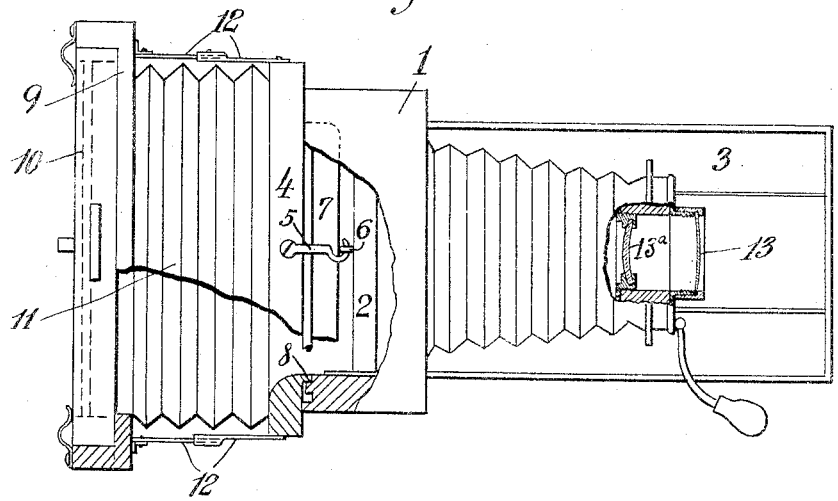

F. B. MILLARD.
PHOTOGRAPHIC INSTRUMENT.
APPLICATION FILED APR. 10, 1912.

1,037,035.

Patented Aug. 27, 1912.

Witnesses:
M. Strickland
Edmund Dubocq

Frank Bailey Millard Inventor
By his Attorneys
Edwards, Sager & Wooster

UNITED STATES PATENT OFFICE.

FRANK BAILEY MILLARD, OF PALISADE, NEW JERSEY.

PHOTOGRAPHIC INSTRUMENT.

1,037,035.  Specification of Letters Patent.  Patented Aug. 27, 1912.

Application filed April 10, 1912. Serial No. 689,771.

*To all whom it may concern:*

Be it known that I, FRANK BAILEY MILLARD, a citizen of the United States, residing at Palisade, in the county of Bergen and State of New Jersey, have invented certain new and useful Improvements in Photographic Instruments, of which the following is a full, clear, and exact specification.

My invention relates to photographic instruments and particularly to an improved construction of cameras by which a small sized instrument may be utilized and obtain advantages not heretofore obtainable with instruments of corresponding size or with instruments of moderate cost of manufacture.

One object of my invention is to provide auxiliary attachable and detachable means adapted to be used in connections with small cameras, such as folding pocket cameras, by which the size of the plates or films employed may be greatly increased over that normally used in such cameras, thus practically converting a small camera into one enabling the photographer to take much larger pictures with small cameras than has been done heretofore. For example, by the use of my improved device, a camera ordinarily adapted for a 4x5 inch plate or film holding capacity, a photographer may use plates or films of 6½ by 8½ inches or larger and produce a negative of sharp definition.

My invention comprises an attachable and detachable tapering chamber preferably in the form of a regular camera bellows having a light rectangular frame at each end, the outer or larger frame forming a receptacle for a focusing screen or ground glass and plate or film holders, while the inner or smaller frame is made to fit the back of the camera. This auxiliary device is adapted to be attached, with suitable light-traps, to the back of standard types of cameras, which are normally adapted to take pictures of comparatively small size.

A further feature of my invention is the provision of a plano-convex, a convexo-concave, or other form of suitable magnifying lens having its radius or radii of curvature comparatively great for use in the camera when large sized plates or films are to be exposed, and which lens is substituted for either one of the double lenses ordinarily used in the camera. I preferably substitute this magnifying lens in place of the outer one of the two lenses commonly used, as this substitution is easily accomplished by removing the outer lens and placing the magnifying lens over the regular lens hood of the camera. Thus by my invention the capacity of the camera is enlarged, so that instead of cutting a plate of small or medium size, it will cut a larger plate and produce a negative having a larger image and of sufficient sharpness and fineness of detail without material distortion.

These and other objects and advantages of my invention will be understood from the following description and accompanying drawings.

Figure 2:
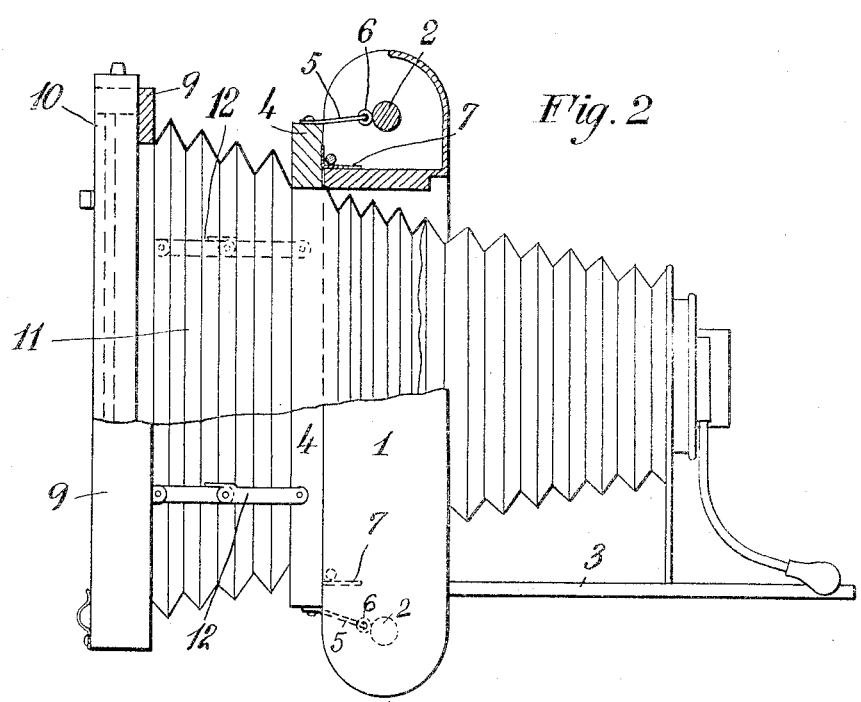

Figure 1 is a plan view, partly broken away, of one form of an instrument embodying my invention; and Fig. 2 is a side view thereof with certain parts broken away in order to more clearly show the detailed construction of certain parts.

The camera to which my invention is applied, in the particular form illustrated in the drawings, is a folding pocket camera, in which 1 represents the casing and at the ends thereof are the spools 2, which normally carry the film rolls. The part 3 is a cover hinged to the frame and in closed position protects the front part of the instrument. As shown in the drawings, this cover has been opened and the bellows carrying the lenses and other parts is extended, the position of the end of the bellows being adjustable for properly focusing the image upon the plate or film. The back cover plate normally used on the type of pocket camera illustrated, is shown removed.

Secured to the back of the camera is represented an auxiliary chamber which is readily attachable and detachable. This removable chamber is made up of a frame 4 adapted to be secured to the frame of the camera by suitable means, as by the hooks 5 which engage the eyes of the screws 6, which latter are shown as being fixed to the wooden spindles of the film holders 2. In order to make the connection of the frame 4 to the back of the camera light tight, and also to assist in holding the chamber firmly in position, I have shown the frame 4 as carrying upper and lower thin plates 7 closely engaging the upper and lower portions of the camera frame. The sides of the frame 4 are likewise provided with one or more projecting parts 8 engaging grooves in the frame of the camera so as to form a light-tight joint. Of course, various means of forming this joint and of attaching the chamber to the camera may be utilized.

The chamber is provided with a large sized back frame 9 adapted to receive and hold in position the plate or film holders 10 or a frame containing a ground glass when used for focusing, such plate, film or ground glass holders being readily inserted or removed in the usual manner. Extending between the frames 4 and 9 is a bellows 11. Between these frames I have shown links 12 adapted to hold the frames firmly when the chamber is in its extended position and to permit the same to be folded when not in use. If desired, the chamber may have rigid or non-collapsible walls, although the construction as shown in the drawings is preferable. The auxiliary chamber is adapted to receive a plate, film or ground glass holder in the frame 9, which is much larger than that ordinarily used in the camera without this attachment. It will also be seen that the auxiliary chamber is readily attachable and detachable so that it may be easily used or not used according to the desire of the operator. I have found that by using a plano-convex, a convexo-concave, or other suitable form of magnifying lens having its radius or radii or curvature comparatively great as shown at 13 in place of the outer one of the usual double camera lenses, that the results obtained are very much improved. This substitute or supplementary lens may be readily placed in position by simply unscrewing the outer regular lens and slipping the lens case of the magnifying lens 13 over the lens hood or socket, as shown in the drawings. The regular inner lens is shown at 13$^a$. Furthermore, I preferably use such form of substitute lens as will give an exposed lens surface of much larger diameter than that of the regular camera lens, as shown in Fig. 1. I have also found that equally good results are obtainable by substituting such a magnifying lens for the inner lens of the regular double lenses instead of substituting this magnifying lens for the regular outer lens.

It will, of course, be understood that my invention may be embodied in various forms of construction, the shape, size and form of construction of the auxiliary chamber as well as the means for attaching and detaching the auxiliary frame to the camera proper, being modified to suit the particular preference of the designer. It will likewise be understood that the form of construction of the auxiliary chamber may be varied so as to adapt it for use in connection with cameras of different types and forms.

An important advantage of my invention is that the cost of the auxiliary chamber and substitute lens is comparatively small, and by their use persons are able to make, with small, inexpensive cameras, pictures of fully as great size and of a quality equal to those made on much larger cameras costing very much more than the cost of the small camera with auxiliary chamber and substitute lens. Another advantage is that in making portraits, the photographer using this instrument and substitute lens may place his camera nearer the sitter, and thus be able to make a larger head, bust or figure, with a softness and roundness of the features such as is seen in the best portrait work, a result that cannot be accomplished by the small camera under ordinary conditions. Another advantage is that, as the auxiliary attachment is collapsible into a small space and readily removable, it can be carried by the photographer, along with his small camera, and he will be able by quick adjustment to take either a large or a small picture as desired; thus he practically has at his disposal two cameras with but little additional luggage. Moreover, my invention permits use as a hand camera, either with or without the attachment. Another advantage is that the shutter, because of the admission of more light through the substitute lens which is larger than the rectilinear lens generally used and which it displaces, can be worked faster. Still another advantage is that, with a suitable copying and enlarging lens used in connection with the camera and the attachment, the instrument may be employed in greatly increasing the copying and enlarging capacity of small cameras. For copying and enlarging pictures, plates or films may be directly exposed by the use of my improvement instead of requiring the use of negatives and bromid or other photographic paper in an expensive copying and enlarging camera or lantern. Thus, by the use of my invention, the cost of such copying and enlarging is greatly decreased, the expense being approximately only one-third or less by this means than by that commonly employed (enlarging indirectly from negatives), and at the same time the means at hand are more convenient.

Various other advantages of my improvement will be understood by those skilled in the art and it is apparent that the field of usefulness of a small and inexpensive camera is greatly enlarged by means of my invention.

Having thus described my invention, I declare that what I claim as new and desire to secure by Letters Patent is:

1. The combination with a camera of an auxiliary chamber, and means for detachably connecting said chamber to the back of said camera, said camera having a plurality of lenses, one of said lenses being a supplementary magnifying lens, substantially as described.

2. The combination with a camera of an auxiliary chamber, and means for detachably connecting said chamber to the back of said camera, said camera having a plurality of lenses, the outer of said lenses being a supplementary magnifying lens, substantially as described.

3. The combination with a camera of an auxiliary chamber, and means for detachably connecting said chamber to the back of said camera, said camera having a plurality of lenses, one of said lenses being a supplementary convex lens having the diameter of the exposed lens surface larger than that of the other lens, substantially as described.

4. The combination with a camera of an auxiliary chamber, and means for detachably connecting said chamber to the back of said camera, said camera having a plurality of lenses, the outer of said lenses being a supplementary convex lens having the diameter of the exposed lens surface larger than that of the inner lens, substantially as described.

5. The combination with a camera of an auxiliary chamber, and means for detachably connecting said chamber to the back of said camera, said camera having a plurality of lenses, one of said lenses being a supplementary convexo-concave lens, substantially as described.

In testimony whereof I affix my signature, in presence of two witnesses.

FRANK BAILEY MILLARD.

Witnesses:
L. K. SAGER,
G. N. KERR.